July 14, 1970     HSIA-SI PIEN     3,520,191
STRAIN GAGE PRESSURE TRANSDUCER
Filed Aug. 22, 1968     3 Sheets-Sheet 1
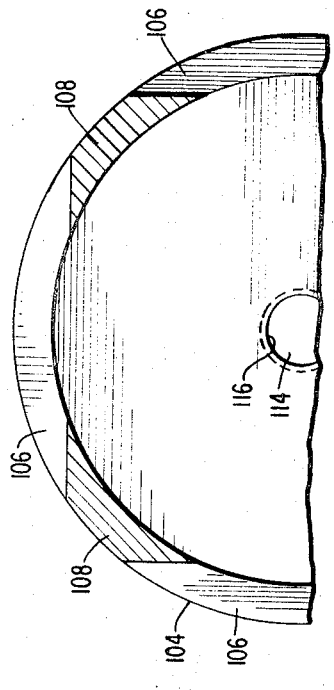
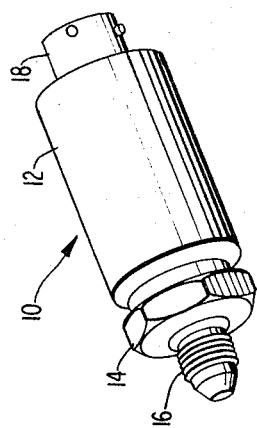
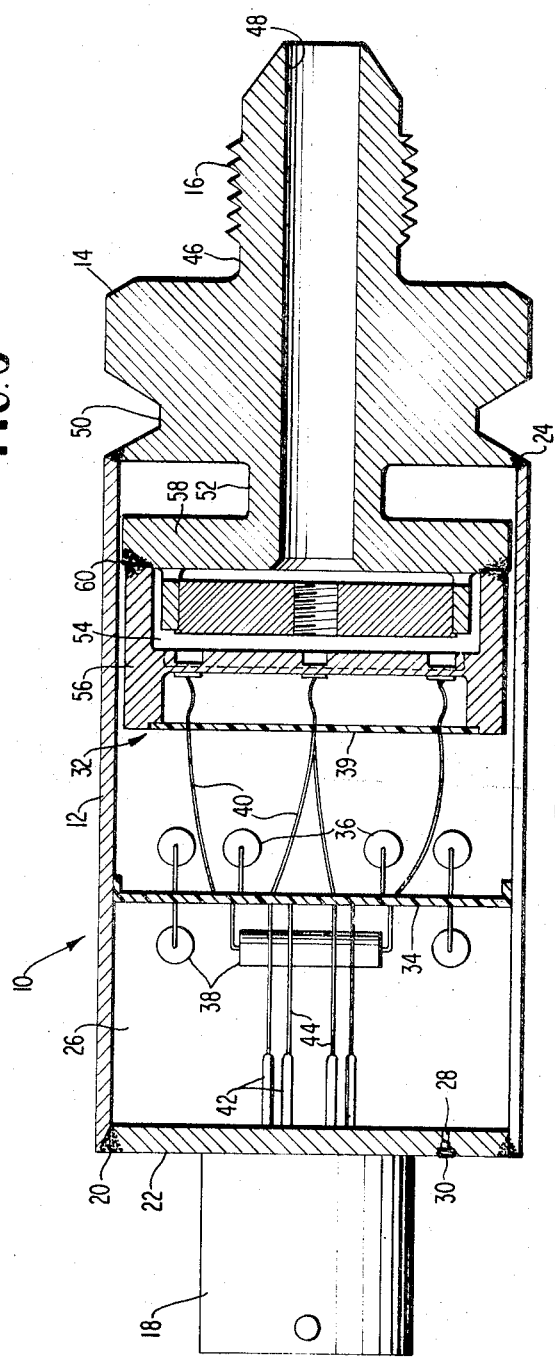
INVENTOR
HSIA-SI PIEN
BY *Le Blanc & Shur*
ATTORNEY

INVENTOR
HSIA-SI PIEN

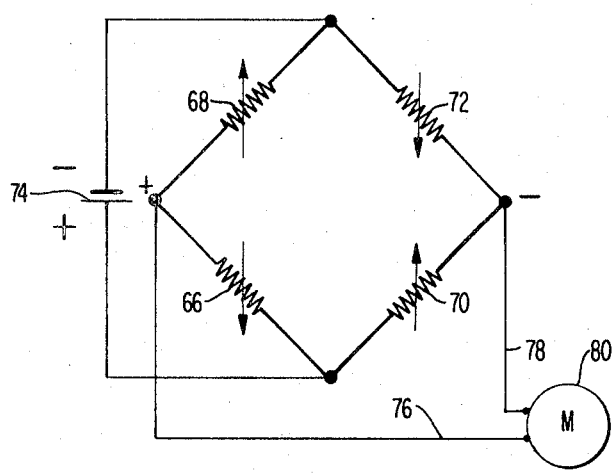
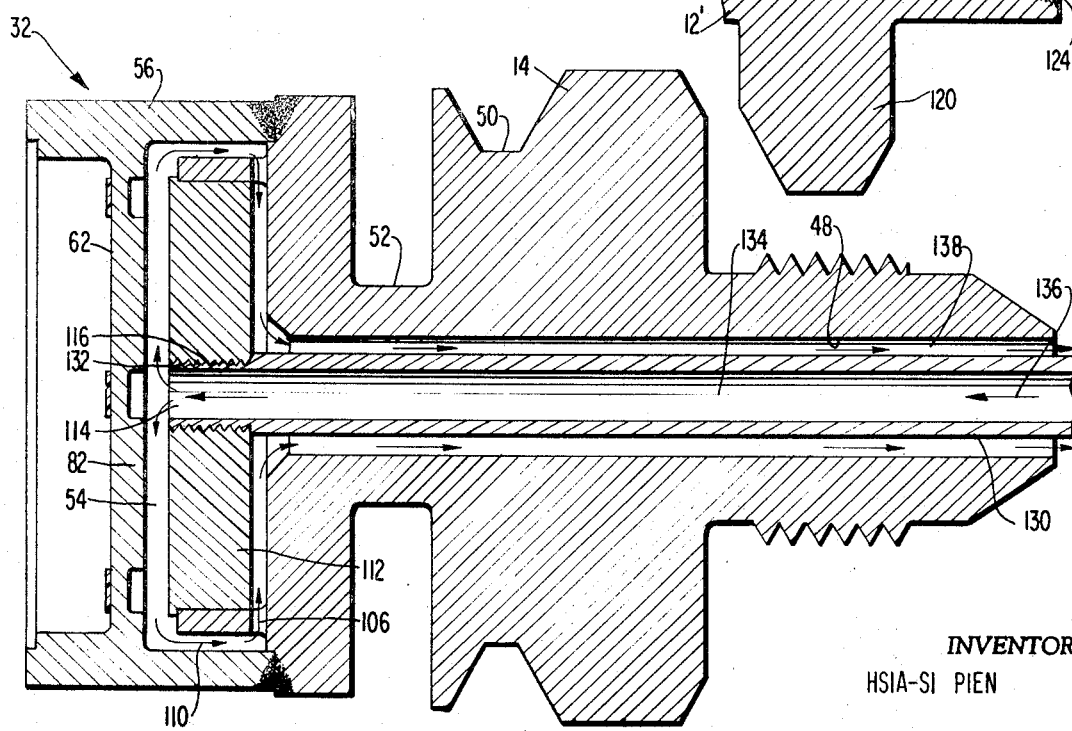

United States Patent Office 3,520,191
Patented July 14, 1970

3,520,191
STRAIN GAGE PRESSURE TRANSDUCER
Hsai-Si Pien, East Amherst, N.Y., assignor to Kistler Instrument Corporation, Clarence, N.Y., a corporation of Delaware
Filed Aug. 22, 1968, Ser. No. 754,594
Int. Cl. G01i 9/04
U.S. Cl. 73—398                16 Claims

ABSTRACT OF THE DISCLOSURE

Disclosed is a pressure transducer for sensing pressure in all types of fluids, both stationary and moving. The transducer includes a diaphragm with an integral thickened section forming a force sensing beam. The beam is slotted at its ends and center to form weakened force concentration sections to which are bonded strain gages electrically connected to form a Wheatstone bridge. Clamping couples at the ends of the beam are reduced by attaching the diaphragm to a support ring having different internal diameters on opposite sides of the diaphragm. One side of the diaphragm faces a sealed reference pressure chamber and the other side of the diaphragm is exposed to the pressure fluid.

---

This invention is directed to a small, lightweight and extremely rugged pressure transducer and more particularly to an integrated beam and diaphragm strain gage pressure transducer which measures pressure with improved stability and reliability over a wide temperature range and under severe environmental conditions.

Diaphragm-type pressure gages are well known and are used in a variety of applications to sense fluid pressures and to produce an electrical output signal representative of the pressure acting on the diaphragm. Many of the prior devices utilize a force summing diaphragm which is coupled by a transmission rod to a force sensing beam for producing an output indicative of the pressure force acting on the diaphragm. However, insofar as applicant is aware, these prior devices have suffered from several disadvantages, including lack of linearity and a relatively large hysteresis effect. The hysteresis effect results in an output signal which is not the same for increasing pressures over a given range as it is for decreasing pressures over the same range.

The novel pressure transducer of this invention avoids the above-mentioned and other difficulties by providing a device in which a bending beam is integrated into a force summing diaphragm so as to completely eliminate any need for an intermediate transmission rod or corresponding structure. In the present invention, a pressure sensing, flat diaphragm is formed with a built-in bending beam having weakening notches or slots on the pressure fluid side of the diaphragm. The electrical pickoff is in the form of a Wheatstone bridge having four resistance strain gages bonded to the other side of the bending beam across from the force concentrating slots. This makes possible a simplified construction completely eliminating the need for a transmission rod and also substantially reduces the hysteresis effect in the transducer.

The stress ratio between the compression members of the beam and the tension members of the beam can be adjusted by varying the ratio of the thickness of the beam underneath the strain gages. By equalizing the stress among the gages, a maximum output with moderate peak stress can be easily obtained to provide a more stable transducer sensing element. In addition, the linearity of the strain gage bridge output due to pressure can be controlled within a limited range by varying the clamping effect on the ends of the sensing beam through changing the ratio of the diameter of one side of the diaphragm in relation to the diameter of the other side of the diaphragm.

Since there is no piston, rod or other moving parts to produce friction, hysteresis is extremely low. Also, the simplicity of the construction greatly enhances reliability. With the combined sensing element and diaphragm completely strain isolated from the transducer case, clamping, mounting, and torque sensitivities are effectively eliminated. Mechanical isolation also minimizes shock sensitivity and effects due to temperature transients. The transducer may be used to sense the pressure of any type of fluid, both liquid and gas, and may be used with stationary, flowing or corrosive fluids to which the stainless steel construction is resistant. It can be used to measure pressures in rocket engines, high speed supercharged diesel engines, in ammunition testing, ballistics, fuel injection, and gas turbine engines, as well as in many other applications for sensing pressures in the neighborhood of from 0 to 3000 p.s.i.a.

It is therefore one object of the present invention to provide an improved pressure transducer.

Another object of the present invention is to provide an improved bonded strain gage pressure transducer usable with a meter to form a pressure gage for measuring a wide range of fluid pressures.

Another object of the present invention is to provide a strain gage pressure transducer of small, lightweight and extremely rugged construction.

Another object of the present invention is to provide an improved pressure transducer for sensing a wide range of pressures under severe environmental conditions, including extreme shock and temperature environments.

Another object of the present invention is to provide a pressure transducer capable of sensing pressures in substantially all types of fluids, including liquids, gases and corrosive fluids.

Another object of the present invention is to provide a highly linear pressure transducer having no moving or sliding parts and evidencing an extremely low hysteresis effect.

These and further objects and advantages of the invention will be more apparent upon reference to the following specification, claims, and appended drawings, wherein:

FIG. 1 is a perspective view of the novel pressure transducer of the present invention drawn to approximately actual size;

FIG. 2 is a vertical section through the transducer of FIG. 1 showing the novel bonded strain gage and integrated beam-diaphragm construction of this invention;

FIG. 5 is a partial cross section showing the pressure chamber construction and taken along line 5—5 of FIG. 3;

FIG. 6 shows the strain gage pickoff of the pressure transducer connected in a Wheatstone bridge circuit;

FIG. 7 is an enlarged view showing a modified embodiment of the bonded strain gage and integrated diaphragm-beam pressure transducer of this invention;

FIG. 9 shows a portion of the transducer with a cleaning tube inserted and illustrates the manner in which the pressure chamber may be periodically cleaned.

Figure 3:
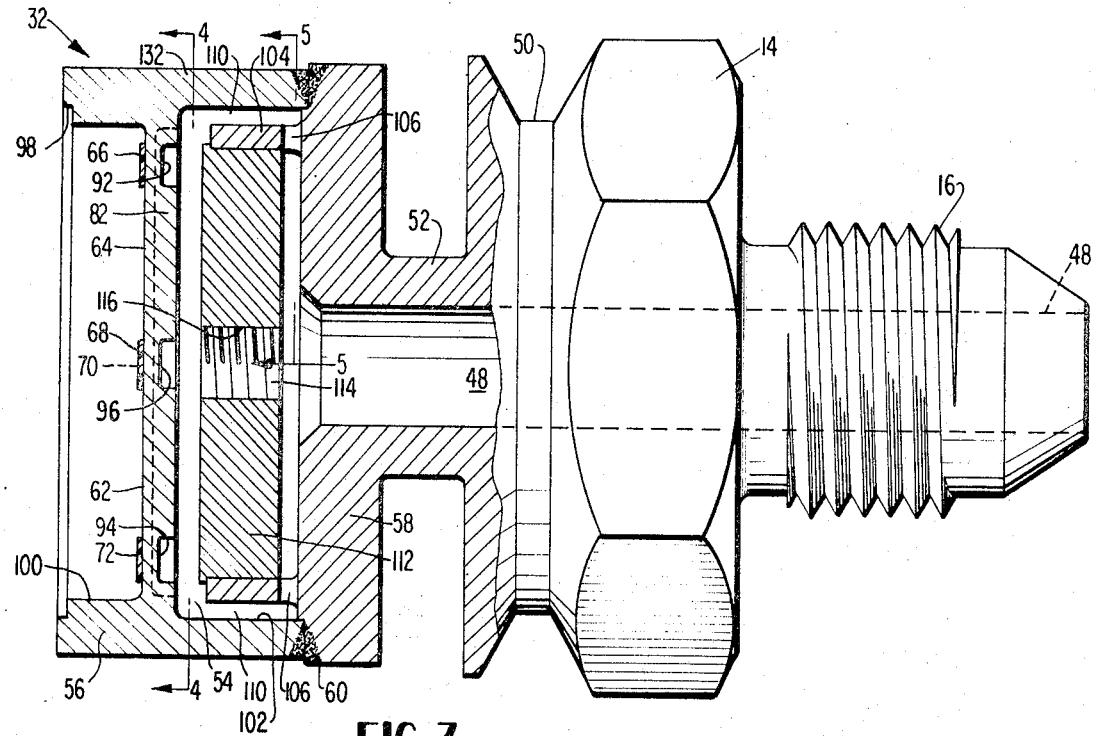
FIG. 3 is an enlarged vertical section similar to FIG. 2 through a portion of the transducer of this figure.

Referring to the drawings, the transducer is illustrated at 10 in FIG. 1, which is a perspective view drawn to approximately actual size. That is, in the embodiment shown and described, the transducer has an overall length of approximately 3 inches, a 1 inch diameter, and a total weight of approximately 3.5 ounces. The transducer 10 comprises a stainless steel case 12 provided at one end with a hex head base 14 and threads 16 for mounting the transducer on a suitable support. The other end of the transducer is provided at 18 with a six pin bayonet-type electrical receptacle for taking an electrical output from the transducer.

Referring to FIG. 2, tubular casing 12, preferably made of stainless steel, is welded at one end as indicated at 20 to an end plate 22 formed integral with connector receptacle 18. The other end of casing 12 is welded as at 24 to base 14 formed integral with the threaded mounting projection 16. Casing 12, in conjunction with end plate 22 and base 14, forms a chamber 26 which is preferably evacuated to a near vacuum by way of an aperture 28 in end plate 22. After evacuation of the chamber, aperture 28 is closed off by a suitable seal 30. Evacuated chamber 26 provides a reference pressure for one side of the diaphragm and integrated bending beam assembly, generally indicated at 32.

Mounted within chamber 26 is a printed circuitboard 34 on which are mounted a plurality of electrical components, such as resistors, capacitors, and the like, indicated at 36 and 38, to provide compensation for the electrical output. The pressure sensing assembly 32 is connected to the components on board 34 by way of leads 40 passing through a harness board 39 and the circuitboard components are in turn connected to receptacle pins 42 by way of leads 44.

Base 14 is provided with a central passageway 48 through which pressure fluid enters the transducer as indicated by the arrow 46. Base 14 is provided with an annular groove 50 for mounting purposes and includes a reduced neck or tube 52 which serves as a relief tube to isolate the pressure sensing assembly 32 from mounting torque. Passageway 48 feeds into a pressure chamber 54 formed by a ring 56 and the head 58 of base 14. Ring 56 is welded to head 58 as indicated at 60.

Figure 4:
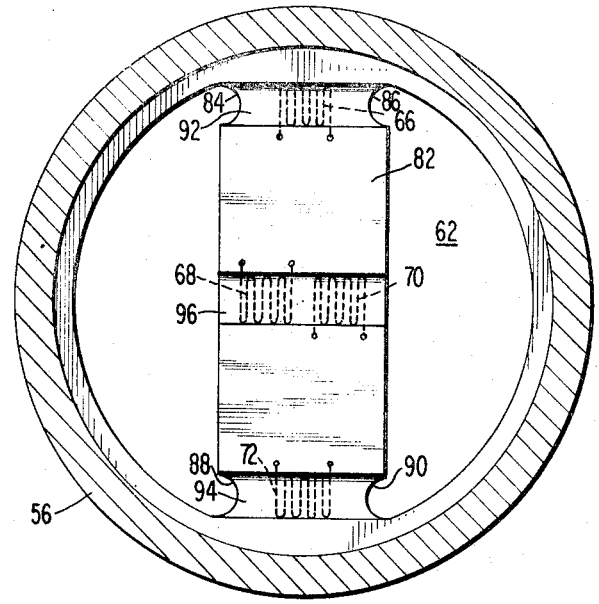
FIG. 4 is a cross section taken along line 4—4 of FIG. 3.

Referring to FIGS. 3–5, formed integral with the stainless steel ring 56 is a circular diaphragm 62. On the surface 64 of the diaphragm exposed to the vacuum or other reference pressure are mounted four strain gages 66, 68, 70, and 72. Referring to FIG. 4, strain gages 66 and 72 are compression gages, whereas gages 68 and 70 are tension gages. These gages are connected to a Wheatstone bridge as illustrated in FIG. 6. They may be connected in either an A.C. or a D.C. circuit but are preferably connected to a 10 volt D.C. source 74 with the polarity indicated in FIG. 6 and the output from the bridge is taken by way of leads 76 and 78 to the positive and negative sides respectively of a D.C. electrical meter 80. The meter gives a direct linear indication of pressure acting on the diaphragm 62 of FIGS. 3 and 4.

A longitudinal central section of the diaphragm 62 is thickened as at 82 to form a rectangular cross section stainless steel beam integral with the diaphragm 62. Beam 82 is generally of an elongated rectangular configuration, but includes a pair of semicircular notches 84 and 86 at one end and a corresponding pair of notches 88 and 90 at its other end. Notches 84 and 86 are joined by a groove 92 and the notches 88 and 90 are similarly joined by a groove 94. Finally, beam 82 is also provided at its center with a transverse groove 96. Grooves 92, 94, and 96 are formed in the surface of the beam away from the diaphragm, i.e., that surface subjected to the pressure fluid to be measured, but immediately overlie the strain gages 66, 68, 70, and 72, as illustrated in FIG. 4, adhesively secured to the other side of the integral diaphragm-beam.

Ring 56 is provided with an enlarged internal diameter section at 98 adapted to receive the harness board 39 of FIG. 2 and with a reduced diameter section 100 which defines the area of the diaphragm subjected to the reference pressure in vacuum chamber 26 of FIG. 2. Ring 56 on the opposite side of the combination beam-diaphragm is provided with a third portion or section 102 of slightly larger diameter than intermediate section 100 of the ring, which section defines a portion of pressure chamber 54 and also determines the area over which the pressure fluid to be measured in chamber 54 acts on the combination beam-diaphragm structure.

Head 58 of base 14 terminates in an integral annular projection 104 which is cut away as at 106 such that the body of projection 104 is attached to the remainder of head 58 by four small segments 108, two of which are illustrated in the half section of FIG. 5. Cutouts 106 form passageways for return of pressure fluid from pressure chamber 54 by way of an annular chamber 110 formed by the difference between the inner diameter of ring section 102 and the outer diameter of annular projection 104. Welded to annular projection 104 is a filler disc 112 which is provided with a central aperture 114 threaded as at 116 and communicating with the pressure fluid passageway 48 through neck or tube 52 and by means of which pressure fluid gains access to pressure chamber 54.

FIG. 7 shows a modified embodiment of the transducer with like parts bearing like reference numerals. In this embodiment, the sensing assembly 32 is identical to that previously described and includes the ring 56, diaphragm 52, beam 82, and strain gages 66, 68, 70, and 72, previously described. However, in FIG. 7 the casing 12 is modified and is indicated in that figure at 12'. This casing includes a mounting flange 120 and is turned over at its end as at 122 where it is joined to section 102 of ring 56 by welding indicated at 124. Thus, the casing 12' is completely open at its right-hand end as illustrated in FIG. 7 so that the beam side of the diaphragm 62, including the beam 82, is directly exposed to the atmosphere containing the pressure gas or liquid to be measured. The remainder of casing 12' is of identical construction to the casing 12 of FIG. 2 and includes an evacuated chamber 26 which establishes a reference pressure for the other side of the diaphragm 62. Although in the preferred construction chamber 26 is illustrated and described as a vacuum chamber, it is understood that chamber 26 of the embodiments of either FIG. 1 or FIG. 7 may be filled with any reference fluid, including liquid and gas, to establish a reference pressure for one side of the diaphragm. The vacuum is preferred for aerospace applications since it enables the output to be read directly in absolute pressure.

Figure 8:
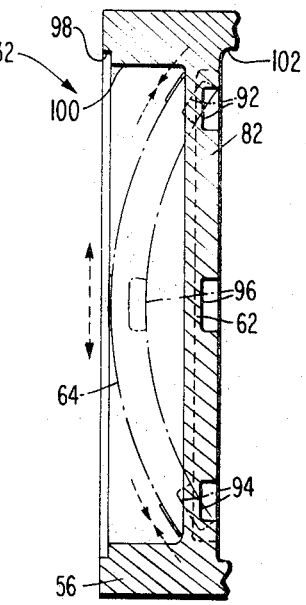
FIG. 8 is a view similar to that of FIG. 7 with the integrated structure flexed under pressure shown in dashed lines.

FIG. 8 is a view of a portion of the sensing assembly 32 and shows in dashed lines how the integrated diaphragm and beam deflects under pressure forces exerted upon it. It can be seen from FIG. 8 that strain gages 68 and 70 overlying groove 96 are under tension as the beam 82 is deflected. These two strain gages form opposite diagonal arms of the Wheatstone bridge circuit illustrated in FIG. 6 and these two diagonal arms may be referred to as the tension arms of the bridge. On the other hand, when the diaphragm and beam deflect in the manner illustrated in FIG. 8, those portions of the beam directly across from slots 92 and 94 and underlying strain gages 66 and 72 are placed under compression. That is, the outer surface 64 of the beam and diaphragm is subject to compression forces at the location of the strain gages 66 and 72 as indicated by arrows in the drawings. These two strain gages form the opposite diagonal arms of the Wheatstone bridge circuit of FIG. 6 and may be referred to as the compression arms of the bridge.

Because of the manner in which the diaphragm, and particularly the beam 82, is mounted, little or no distortion of the beam results during deflection as illustrated in FIG. 8 due to its attachment to the ring 56. This is due in large measure to the slotted nature of the structure at the beam ends and also because of the fact that the internal diameter of section 102 of the ring is slightly larger than the internal diameter of ring section 100. The linearity of the strain gage bridge output due to pressure can be controlled within a limited range by varying the clamping effect on the ends of the sensing beam and this may be accomplished by changing the ratio of the diameter of ring section 102 with respect to the diameter of ring section 100. By suitably selecting the ratios of these two diameters, it is possible to control the output so as to obtain a net linear output from the instrument of 0.5%. In the preferred embodiment, the diameter ratio is 1.07, that is $D_{102}/D_{100}=1.07$. This may be varied in accordance with the pressures to be measured so as to control the clamping coupling at the juncture of the beam with the ring. Diameter ratios of from 1.07 to 1.10 have been found quite successful with the higher ratios more suited to measuring lower pressures. In every case, the diameter of ring section 102 should be larger than the diameter of ring section 100 so that clamping forces at the beam ends do not introduce nonlinearities into the output.

Fluid pressure is applied against the diaphragm and this load is partially transmitted by the diaphragm to the beam and some of it is transmitted to the wall support or ring 56. By means of the integrated diaphragm and slotted beam construction, a much higher percentage of the load (pressure x area) is transmitted by the diaphragm to the beam, rather than to the wall, and this load is concentrated in the area of the beam having the smallest cross section, i.e., the beam portions directly beneath the strain gages and across from slots 92, 94, and 96. With the stress concentration localized in these predetermined areas, the strain gages 66, 68, 70 and 72 are quite sensitive and produce a substantial output for a relatively small beam deflection.

The diaphragm thickness, beam thickness and depth of the slots, as well as the thickness of the strain gage assemblies, are dependent upon the size of the instrument and the pressures to be detected and measured. They may be varied within wide limits consistent with the construction herein shown and described. In general, with diaphragms made of stainless steel identified as Armco 17–4PH, diaphragm thickness of from .015 to .045 inch have been found quite satisfactory. The thickness of the beam, exclusive of the diaphragm, i.e., extending beyond the diaphragm, is preferably in the neighborhood of .045 inch. The thickness of the beam, exclusive of diaphragm, at slot 96 is preferably in the neighborhood of .014 inch, whereas the thickness of the beam, exclusive of diaphragm, beneath slots 92 and 94 is preferably slightly greater, i.e., in the neighborhood of .016 inch. The above dimensions are given by way of example only and have been found suitable for measuring pressures from 0 to as much as 3000 p.s.i.a.

FIG. 9 illustrates how the pressure chamber 54 of the embodiment illustrated in FIGS. 2 and 3 may be periodically cleaned. That is, when the transducer is used to measure gases or liquids which may carry contaminants, after a time it is possible that undesirable solid deposits will build up in pressure chamber 54. In order to remove these deposits, it becomes necessary to pass a cleaning solution through the pressure chamber in the manner illustrated in FIG. 9.

In that figure, an elongated hollow tube 130 is inserted into the fluid passageway 48 and this hollow tube is externally threaded at its end 132 so as to engage with the threads 116 surrounding aperture 114 in filler block 112 located in pressure chamber 54. When the end of tube 130 has been threaded into the filler block, cleaning solution is pumped in from a suitable source (not shown) through the central passageway 134 forming the interior of the hollow tube as indicated by the arrow 136. This fluid passes through the tube and into the chamber 54 where it moves from the chamber in the direction of the arrows through annular passageway 110 and cutouts 106 to return to the source by way of the annular conduit 138 formed by the outer surface of cleaning tube 130 and the inner surface of fluid passageway 48. For optimum cleaning, the end of cleaning tube 130 is alternately connected to a solvent source and to a pressurized air source so that the pressure chamber 54 is alternately subjected to impulses of liquid solvent and pressurized air to completely remove any solids which may have collected in the pressure chamber. Filler block 112 reduces the total capacity of the pressure chamber and minimizes the amount of pressure fluid necessary to deflect the diaphragm and beam assembly 32.

It is apparent from the above that the present invention provides an improved miniature bonded strain gage and pressure transducer. Important features include the provision of an integrated diaphragm and beam construction wherein the beam is slotted to concentrate the stresses sensed by the strain gages and also the manner in which the beam is supported at the ends from a ring having different diameters so as to produce a linear output by controlling the clamping forces at the end of the beam. Further important features include the provision of a novel cleaning assembly for cleaning out the pressure chamber.

Through the use of a filler block, the amount of fluid necessary to fill the pressure chamber is kept at a minimum and, for example, the pressure chamber volume can be as little as 0.05 cubic inch or less. The small pressure chamber requires less fluid to fill it and gives a faster response to varying pressures for the instrument. All welded joints are pressure-tight so that the all-welded stainless steel construction is a hermetically sealed dry construction to insure reliability in severe environments. The miniature, lightweight construction is such that the sensing beam and diaphragm are completely strain isolated from the case so that clamping, mounting, and torque sensitivities are effectively eliminated and the mechanical isolation minimizes shock sensitivity and effects due to temperature transients.

Units constructed in accordance with the present invention have been tested and evidence exceptional thermal zero and sensitivity stability from −65° F to +250° F. The rugged construction gives good linearity, repeatability, and a low hysteresis effect such that readings are quite similar irrespective of whether pressures are increasing or decreasing. The unit can resist mechanical shock of 1000 g. for 1 millisecond pulse duration and 100 g. for 11 millisecond pulse duration applied along any axis. Acceleration and vibration errors are maintained at a minimum.

The transducer may be used to sense pressures from any type of fluid, including liquid or gas, compatible with the Armco 17–4PH stainless steel construction of the entire unit. Various sizes and material thicknesses may be employed depending upon the range of accuracy of the output desired. The strain gages are preferably bonded to the diaphragm by a siutable epoxy adhesive such that the combined thickness of the standard strain gage and the adhesive layer is substantially less than the thickness of the diaphragm. In the preferred embodiment, the ratio of diaphragm thickness to the combined thickness of one of the strain gages and its attaching adhesive layer is approximately 9 to 1. Further reductions in the thickness of either the strain gages or the adhesive layer do not appear to be advantageous since the thinner construction has a tendency to introduce hysteresis effect into the output. Typical fluids, the pressures of which may be measured by the transducer, are air, combustion gases, kerosene, oil, and acids. As previously mentioned, after prolonged measurement of chemical processes, it may be necessary to clean the pressure cavity in the embodiment of FIGS. 2 and 3. The reference chamber may typically be either evacuated or filled with a dry gas to establish a reference pressure.

The invention may be embodied in other specific forms without departing from the spirit or essential character-

What is claimed and desired to be secured by United States Letters Patent is:

1. In a pressure transducer for sensing fluid pressures, a diaphragm having an integral thickened portion forming a force sensing beam, and a plurality of strain gages attached to said beam for sensing stresses on said beam, the periphery of said diaphragm being joined to a ring, the inner diameter of said ring on one side of said diaphragm being greater than the inner diameter of said ring on the other side of said diaphragm.

2. Apparatus according to claim 1 wherein the ratio of said diameters is from about 1.07 to about 1.10.

3. In a pressure transducer for sensing fluid pressures, a diaphragm having an integral thickened rectangular cross section portion forming a force sensing beam, said beam including force concentrating slots at each end and one intermediate its ends, and at least one strain gage secured to said beam adjacent each said slot for sensing deflection stresses in said beam.

4. Apparatus according to claim 3 wherein said strain gages are attached to said beam on the side opposite from said slots.

5. Apparatus according to claim 3 including a pair of strain gages adjacent said intermediate slot, said strain gages forming the four arms of a Wheatstone bridge.

6. Apparatus according to claim 3 including a support ring formed integral with said diaphragm, the internal diameter of said support ring being greater on one side of said diaphragm than on the other.

7. Apparatus according to claim 3 wherein said diaphragm is circular, said beam being centered on a diameter of said diaphragm and extending substantially completely across said diaphragm, said intermediate slot being formed in the center of said beam.

8. A pressure transducer for sensing fluid pressures comprising a sealed reference pressure chamber, a diaphragm closing off a portion of said chamber, said diaphragm including an integral thickened portion forming a substantially rectangular cross sectioned force sensing beam, a plurality of slots in said beam forming respective weakened force concentrating sections in said beam, and at least one strain gage attached to each weakened section of said beam for sensing deflection stresses in said beam.

9. A transducer according to claim 8 wherein the side of said diaphragm opposite from said pressure chamber is directly open to the atmosphere.

10. A transducer according to claim 8 including a pressure fluid chamber on the side of said diaphragm opposite from said reference pressure chamber, a casing surrounding said diaphragm, and a narrow tubular neck spacing said diaphragm and pressure fluid chamber from said casing.

11. Apparatus according to claim 10 including a filler block in said pressure fluid chamber for reducing its volume.

12. Apparatus according to claim 11 including a cleaning tube received in spaced relation through said tubular neck and communicating with said pressure fluid chamber, said cleaning tube being removably secured to said filler block.

13. A pressure transducer for sensing fluid pressures comprising a sealed reference pressure chamber, a circular diaphragm closing off a portion of said chamber, a support ring formed integral with the periphery of said diaphragm, said support ring having an internal diameter on the side of said diaphragm facing said chamber smaller than its internal diameter on the opposite side of said diaphragm, said diaphragm including a thickened portion forming a rectangular cross sectioned integral force sensing beam, said beam extending substantially completely across said diaphragm along a diameter of said diaphragm, said beam including transverse slots at each end and at its center forming weakened force concentrating sections in said beam, said slots being formed in the surface of said beam opposite from said chamber, and at least one strain gage in said chamber attached to each of said weakened sections of said beam for sensing deflection stresses in said beam.

14. A transducer according to claim 13 including a pair of semicircular notches in each end of said beam adjacent said end slots.

15. A transducer according to claim 13 including a pair of tension gages secured to the center weakened section of said beam, said tension gages forming diagonally opposite arms of a Wheatstone bridge, said gages attached to said weakened end sections forming the other arms of said bridge, and an electrical meter coupled to the output of said bridge to indicate the pressure acting on the side of said diaphragm opposite from said chamber.

16. A pressure transducer according to claim 13 made of stainless steel whereby said transducer is resistant to corrosive fluids.

References Cited

UNITED STATES PATENTS 3,035,240     5/1962     Starr _____ 338—4

DONALD O. WOODIEL, Primary Examiner

U.S. Cl. X.R.

338—4